April 10, 1951     W. EMBREY     2,548,711
COMBINED WALKING CANE AND INSTRUMENT SUPPORT
Filed July 2, 1946
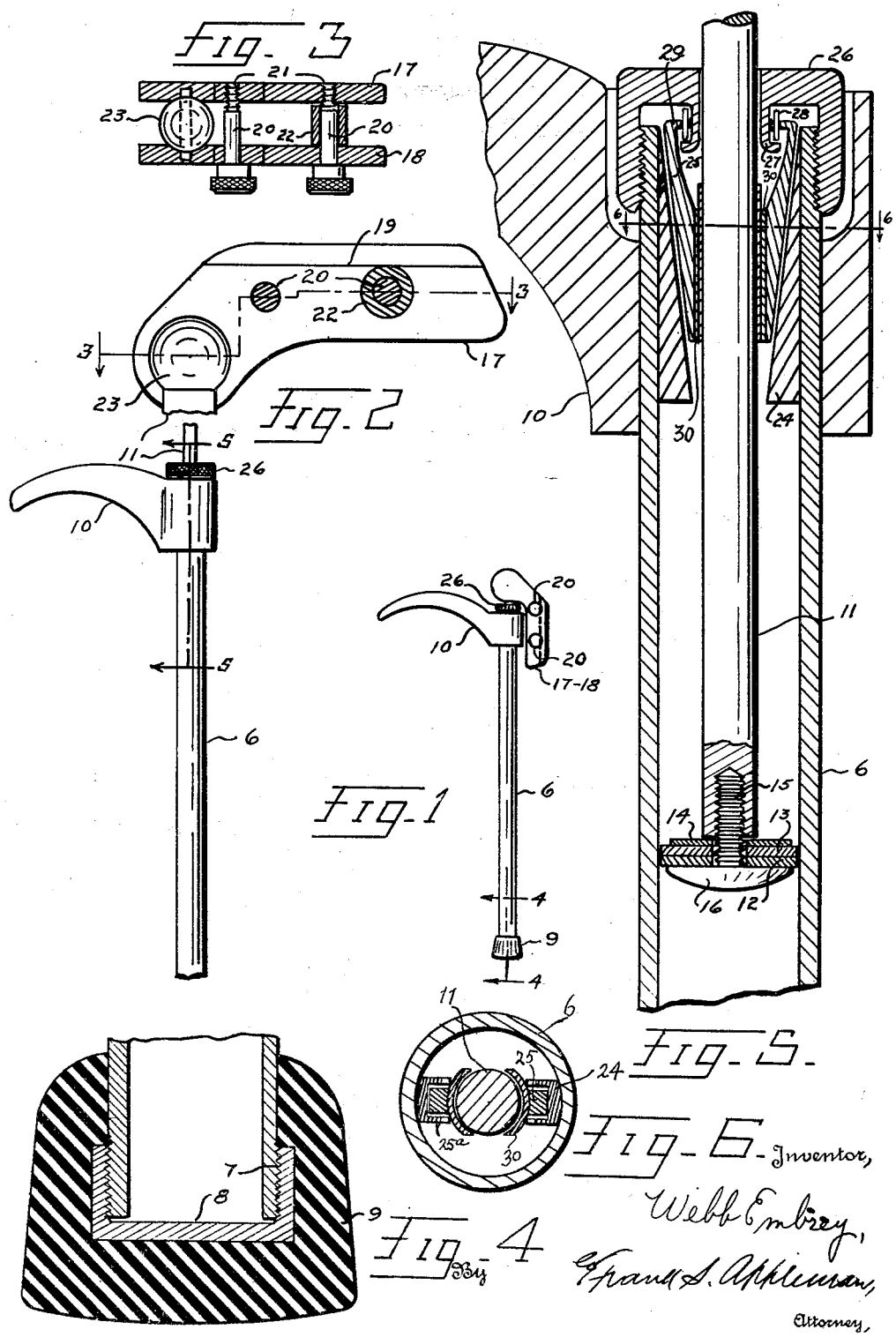
Inventor,
Webb Embrey,
Frank S. Appleman,
Attorney Patented Apr. 10, 1951

2,548,711

UNITED STATES PATENT OFFICE 2,548,711

COMBINED WALKING CANE AND INSTRUMENT SUPPORT

Webb Embrey, St. Joseph, Mo.

Application July 2, 1946, Serial No. 681,093

4 Claims. (Cl. 248—155)

This invention relates to a combined walking stick or cane and a support for surveying instruments, such as a hand level or the like, the said invention having for its object the provision of a tubular element having a base such as is provided on walking sticks or canes and a telescopically arranged staff movable longitudinally of the tube; the said tube being provided with novel means by which the staff is held extended or in different positions of adjustment.

Furthermore, the invention comprises a support for a hand level or the like, which is conveniently mounted on the staff and is carried by the staff when it is projected, and by this means the hand level, which will be hereinafter referred to as a "surveying instrument," may be supported on a level with the eye of the operator while sighting and making his calculations with respect to topography, meets and bounds, and other activities common to such operations.

It is an object of this invention to provide novel means for adjustably holding the instrument support so that it may be moved to hold the instrument in approximately horizontal position, whereas when the support is not in use, it is conveniently moved to a position approximately parallel with the tube where it is inconspicuous and readily manipulatable to the horizontal or the vertical positions.

A further object of this invention is to provide a clamp for the instrument holder whereby the said instrument may be held rigidly with respect to the carrier; and it is furthermore the purpose of the inventor to provide a ball and socket joint between the instrument holder or bracket and the extensible staff.

A further object of this invention is to provide a novel clamp associated with the tubular casing, parts of which may be manipulated for frictionally retaining the staff in different positions of adjustment and in which manually operated means are provided for adjusting the clamp.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views and in which:

Figure 1 illustrates a view in elevation showing one embodiment of the invention;

Figure 2 illustrates an enlarged detail view in which the instrument holder is in section;

Figure 3 illustrates a sectional view of the instrument holder on the line 3—3 of Fig. 2;

Figure 4 illustrates an enlarged detail sectional view of the bottom of the cane;

Figure 5 illustrates a sectional view on an enlarged scale along the line 5—5 of Fig. 2; and Figure 6 illustrates a sectional view of the device on the line 6—6 of Fig. 5.

In these drawings 6 denotes the tubular cane member having external threads 7 at its lower ends, on which a cap 8 is threaded, the said cap and lower end of the tube being supplied with a cushion 9 of rubber or other yielding material. A handle 10 of any appropriate shape or material may be mounted on the upper end of the tube, and a staff 11 is slidable in the tube and projects from the upper end thereof. The staff preferably has friction elements, such as washers, 12 and 13, superimposed at the lower end of the staff, and the upper of said washers is engaged by a plate 14. The washers and plate have coinciding apertures to receive a screw 15 which is threaded in the lower end of the staff, and the screw has a head 16 which bears against the lowermost washer, so that by inserting the screw in the staff the washers and plate may be held in operative position, and preferably, the peripheries of the washers can be made to frictionally engage the inner surface of the tube to hold the staff in position while it is being adjusted as to height for holding the instrument at the proper level and thereafter the staff may be clamped into place, as will presently appear.

The instrument holder comprises two spaced plates 17 and 18, each with a shoulder 19 on its inner surface near the upper edge on which the instrument may be lodged and supported. The plates are adjustably connected by screws 20 freely rotatable in one of the side plates and threaded in the other side plate, as at 21. If desired, the spacing of the plates may be regulated in known manner as by a collar 22, although that is a detail which may be changed to suit particular requirements. It is shown that the upper end of the staff carries a ball 23 and that the ball is clamped between the two plates so that the instrument holder is held at different positions of adjustment by frictional contact of the plates and ball.

A clamp is provided, as stated, at the upper end of the tubular member, and, in order to provide the clamping action, the inner surface of the tube is provided with beveled channeled ribs 24 which taper upwardly, and the inner surfaces of these ribs are engaged by clamping members such as 25, each of which engages the surface of the rib and has a surface complemental to that of the rib so that when the clamping members are moved downwardly on the ribs, they force the inner surfaces of the clamps into engagement with the staff and hold it rigid. In order to move the clamping members longitudinally, an apertured cap 26 is threaded on the upper end of the tube, and the said cap has a depending annular flange 27 in which the staff is movable, and the said annular flange has an out-turned extension forming an annular shoulder on which wheels or rollers 28 ride, and the said rollers are rotatable on trunnions 29 formed integral with the clamping members so that as the cap 26 is turned and moves up or down, the rollers riding on the extension of the flanges cause the clamping members to be adjusted with relation to the ribs for clamping or releasing the staff so that it is held extended or is allowed to recede within the tube to its nested position. There is a leather bushing 30 interposed between the clamp and the staff in order that the frictional contacts between these parts will effectively hold the staff in its different positions of adjustment.

It is shown that the clamping members 25 ride on the ribs (Fig. 6) in the channels formed by the flanges 25a and that Figure 2 has been broken away and that the upper part is enlarged compared with the lower part in order to clearly illustrate the structural features thereof, and Figure 3 is also enlarged so that a better understanding of the structural features can be had. It is obvious that these parts may be of appropriate size for performing the intended functions.

I claim:

1. A combined walking cane and instrument support comprising a tubular member having external threads at its upper end, a handle attached to the said member, ribs extending longitudinally of the member and secured to the inner wall thereof at the upper end, clamping members coacting with the ribs, means for moving the clamping members with relation to the ribs, an apertured cap engaging the said threads of the member, a staff extending through the cap and adapted to be clamped at different positions of adjustment by the clamping members, means thereon for operating the clamping members and moving them with relation to the ribs, and an instrument holder mounted on the outer end of the staff.

2. A combined walking cane and instrument support comprising a tubular member having external threads at its upper end, a handle mounted on the tubular member, longitudinally extending ribs on the inner surface of the tubular member, clamping members coacting with the ribs for forcing the clamping members into clamping position, an apertured cap threaded on the tubular member, a staff movable between the clamping members and through the aperture of the cap, and means on the cap mediately connected with the clamping members for operating the clamping members with relation to the staff, and an instrument holder mounted on the outer end of the staff.

3. A combined walking cane and instrument support comprising a tubular member having a suitable handle, an apertured cap attached to and movable longitudinally of the tubular member, camming ribs extending longitudinally of and attached to the inner surface of the tubular member, clamping members having camming surfaces engaging the camming surfaces of the ribs and operative to move inwardly and outwardly transversely of the tubular member, a staff slidable in the tubular member extending between the clamping members and through the aperture of the cap, a bushing interposed between the clamping members and the staff, means on the cap mediately connected to the clamping members whereby the movement of the cap longitudinally of the tubular member moves the said clamping members longitudinally with their camming surfaces engaging the camming surfaces of the ribs whereby the clamping members are moved toward and away from the staff for holding the staff at different positions of adjustment, and an instrument support mounted on the outer end of the staff.

4. A combined walking cane and instrument support according to claim 3, in which a ball is carried by the outer end of the staff and the instrument support comprises spaced plates engaging the ball, and means for adjusting the plates with relation to each other and with relation to the ball whereby the plates are frictionally held for movement to an approximately vertical position or to positions at angles thereto.

WEBB EMBREY.

REFERENCES CITED

The following references are of record in the file of this patent:

UNITED STATES PATENTS

| Number | Name | Date |
| --- | --- | --- |
| 689,855 | Copeland | Dec. 31, 1901 |
| 1,970,624 | Recker | Aug. 21, 1934 |
| 2,016,744 | Heck | Oct. 8, 1935 |

FOREIGN PATENTS

| Number | Country | Date |
| --- | --- | --- |
| 668,962 | France | July 23, 1929 |
| 32,535 | Denmark | Nov. 26, 1923 |
| 137,104 | Germany | Oct. 6, 1901 |